United States Patent
Baarman

(10) Patent No.: US 7,518,267 B2
(45) Date of Patent: Apr. 14, 2009

(54) POWER ADAPTER FOR A REMOTE DEVICE

(75) Inventor: David W. Baarman, Fennville, MI (US)

(73) Assignee: Access Business Group International LLC, Ada, MI (US)

( * ) Notice: Subject to any disclaimer, the term of this patent is extended or adjusted under 35 U.S.C. 154(b) by 440 days.

(21) Appl. No.: 10/689,375

(22) Filed: Oct. 20, 2003

(65) Prior Publication Data

US 2004/0150934 A1    Aug. 5, 2004

Related U.S. Application Data

(63) Continuation-in-part of application No. 10/357,932, filed on Feb. 4, 2003, now Pat. No. 7,126,450.

(60) Provisional application No. 60/444,794, filed on Feb. 4, 2003.

(51) Int. Cl.
H02J 7/00 (2006.01)
H02J 9/00 (2006.01)

(52) U.S. Cl. .................. 307/150; 320/108
(58) Field of Classification Search ........ 307/150, 307/104, 40; 320/108, 103, 106; 713/310
See application file for complete search history.

(56) References Cited

U.S. PATENT DOCUMENTS

| | | | |
|---|---|---|---|
| 3,689,885 A * | 9/1972 | Kaplan et al. | 340/10.1 |
| 3,938,018 A | 2/1976 | Dahl | |
| 3,949,268 A | 4/1976 | von Mangoldt | |
| 4,800,328 A | 1/1989 | Bolger et al. | |
| 4,818,855 A | 4/1989 | Mongeon et al. | |
| 5,229,652 A | 7/1993 | Hough | |
| 5,341,280 A | 8/1994 | Divan et al. | |
| 5,428,659 A | 6/1995 | Renner et al. | |
| 5,455,466 A * | 10/1995 | Parks et al. | 307/104 |
| 5,455,467 A | 10/1995 | Young et al. | |
| 5,550,452 A | 8/1996 | Shirai et al. | |
| 5,600,225 A * | 2/1997 | Goto | 320/108 |
| 5,701,657 A | 12/1997 | Sakamoto | |
| 5,734,254 A * | 3/1998 | Stephens | 320/106 |

(Continued)

FOREIGN PATENT DOCUMENTS

EP        0558316        2/1993

(Continued)

OTHER PUBLICATIONS

Gulko, Michael, et al, Inductor-Controlled Current-Sourcing Resonant Inverter and its Application as a High Pressure Discharge Lamp Driver, IEEE, pp. 434-440, May 1994.

(Continued)

*Primary Examiner*—Albert W Paladini
*Assistant Examiner*—Carlos Amaya
(74) *Attorney, Agent, or Firm*—Warner Norcross & Judd LLP

(57) ABSTRACT

An adapter allows a remote device to use a contactless power supply. The adapter has a contactless power interface for receiving power from a contactless power supply and a power regulator for supplying power to the remote device. The adapter may have a rechargeable power source for operating the adapter and a power regulator.

15 Claims, 6 Drawing Sheets

U.S. PATENT DOCUMENTS

| | | |
|---|---|---|
| 5,814,900 A | 9/1998 | Esser et al. |
| 5,831,348 A | 11/1998 | Nishizawa |
| 5,982,764 A | 11/1999 | Palermo et al. |
| 6,057,668 A * | 5/2000 | Chao .......................... 320/108 |
| 6,127,799 A | 10/2000 | Krishnan |
| 6,252,380 B1 | 6/2001 | Koenck |
| 6,265,791 B1 | 7/2001 | Eberl et al. |
| 6,301,128 B1 | 10/2001 | Jang et al. |
| 6,323,775 B1 | 11/2001 | Hansson |
| 6,424,124 B2 * | 7/2002 | Ichihara et al. ............. 320/149 |
| 6,429,622 B1 | 8/2002 | Svensson |
| 6,462,432 B1 | 10/2002 | Seelig et al. |
| 6,597,076 B2 | 7/2003 | Scheible et al. |
| 6,683,438 B2 * | 1/2004 | Park et al. .................. 320/108 |
| 6,703,920 B2 * | 3/2004 | Zimmer .................... 340/10.34 |
| 6,821,670 B2 * | 11/2004 | Hsueh ........................ 429/98 |
| 6,844,702 B2 * | 1/2005 | Giannopoulos et al. ..... 320/108 |
| 6,977,479 B2 * | 12/2005 | Hsu ........................... 320/101 |
| 2002/0082059 A1 | 6/2002 | Nariai et al. |
| 2003/0006880 A1 | 1/2003 | Zimmer |
| 2003/0090239 A1 * | 5/2003 | Sakakibara ................ 320/166 |

FOREIGN PATENT DOCUMENTS

| | | |
|---|---|---|
| EP | 1096641 | 5/2001 |
| JP | 3011829 | 3/1995 |
| JP | 10-233235 | 9/1998 |
| JP | 11-168837 | 6/1999 |
| JP | 2000-287375 | 10/2000 |
| JP | 2001-268823 | 9/2001 |
| WO | WO 00/54387 | 9/2000 |
| WO | WO 01/80396 A1 | 10/2001 |

OTHER PUBLICATIONS

English Abstract of Japanese Patent Publication No. 11-168837.
English Abstract of Japanese Patent Publication No. 10-233235.
English Abstract of Japanese Patent Publication No. 2000-287375.
English Abstract of Japanese Patent Publication No. 2001-268823.

* cited by examiner

POWER ADAPTER FOR A REMOTE DEVICE

RELATED APPLICATIONS

This application claims priority to and benefit of U.S. Provisional Application No. 60/444,794, entitled Adaptively Inductively Coupled Ballast Circuit, by David W. Baarman, filed Feb. 4, 2003. The full disclosure of the prior application is incorporated herein by reference. This application is a continuation-in-part of U.S. application Ser. No. 10/357,932, now U.S. Pat. No. 7,126,450 Feb. 4, 2003 entitled Inductively Powered Apparatus, which is hereby incorporated by reference.

This application incorporates by reference the following applications filed on the same date and assigned to the same assignee as this application: Adaptive Inductive Power Supply, Ser. No. 10/689,499; Inductive Coil Assembly, Ser. No. 10/689,224 now U.S. Pat. No. 6,975,198; Electrostatic Charge Storage Assembly, Ser. No. 10/689,154 and Adaptive Inductive Power Supply with Communication, Ser. No. 10/689,148.

BACKGROUND OF THE INVENTION

This relates generally to electronic devices, and more specifically to the contactless supply of power and communication to an electronic device.

A CPS (contactless power supply) provides power to a remote device without any physical connection. An adaptive CPS allows power to be simultaneously provided to a number of different remote devices. Thus, a CD player, an MP3 player, and a cellular telephone could all be supplied power from the same adaptive CPS at the same time. One of the primary advantages of an adaptive CPS is to free the user from maintaining an array of charging equipment, cables and batteries to power the system. With a CPS and appropriately equipped remote devices, there is no need for separate chargers, cables and batteries for each remote device.

However, these remote devices must be constructed with the ability to obtain power from the CPS. There are many remote devices that are in use which have not been specifically built to use a CPS.

Some remote devices, such as MP3 players, are required to communicate with workstations. When connecting such a remote device to a workstation, the user connects a cable between the remote device and the workstation. The use of the cable further clutters the work area around the workstation and causes increased problems.

An adapter to enable these remote devices with no CPS power interface to utilize a CPS would be highly desirable. An adapter which would also enable the remote devices to access a workstation is also highly desirable.

SUMMARY OF THE INVENTION

An adapter for coupling a remote device with a rechargeable power source has a contactless power interface and a power regulator for supplying power to the remote device. The adapter may have a rechargeable power source, such as a battery, for powering the adapter. The adapter may also have a first transceiver for communicating with the contactless power supply.

The adapter may have a second transceiver for communicating with the remote device. Alternatively, the adapter may have simply a transmitter.

The contactless power interface may include a variable impedance element, such as a variable inductor. A controller is coupled to the variable impedance element and can change the impedance of the variable impedance element. The controller changes the impedance of the variable impedance element in response to instructions from the contactless power supply.

The operating of the adapter may include obtaining charging information from the remote device and then providing the charging information to the contactless power supply. Power is then supplied to the remote device. Alternatively, the adapter may have a memory which is pre-loaded with power information for the specific remote device.

If equipped with a first and second transceiver, the adapter establishes a first communication link between the adapter and the contactless power supply. The adapter establishes a second communication link between the adapter and the remote device. The adapter then receives the power requirement information from the remote device and sends the power requirement information to the contactless power supply.

When the adaptive power interface has an adjustable element, then the contactless power supply will be set to an optimal setting for the adjustable element. If the adjustable element is a variable inductor, and the step of determining an optimal setting for the adjustable element comprises determining the optimal inductance setting for the variable inductor.

The adapter and the method for operating the adapter allow a remote device to use a contactless power supply even though the remote device was not specifically designed to operate with a contactless powers supply. Additionally, the adapter allows for the remote device to be connected to a workstation attached to the contactless power supply.

These and other objects, advantages and features of the invention will be more readily understood and appreciated by reference to the detailed description of the drawings.

DETAILED DESCRIPTION OF THE DRAWINGS

Figure 1:
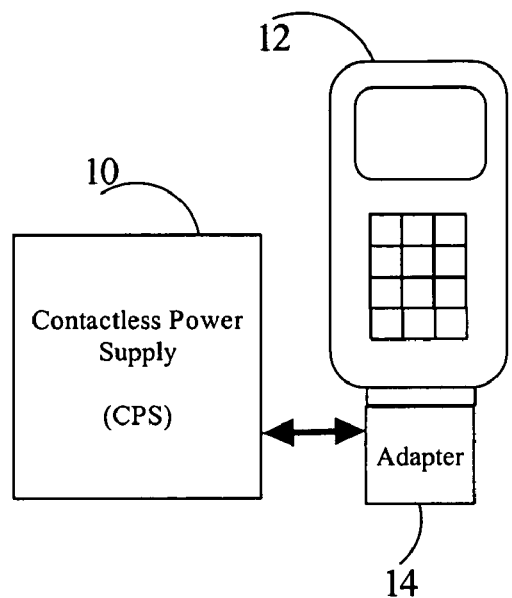
FIG. 1 shows an adapter, a remote device and a CPS.

FIG. 1 shows CPS 10 connected to remote device 12 by way of adapter 14. Remote device 12 could be a notebook computer, a PDA (personal digital assistant), a cellular telephone, an MP3 (Moving Picture Experts Group Layer-3 Audio) player, or any one of a myriad of portable electronic devices. CPS 10 provides power to remote device 12 through adapter 14. Further, if remote device 12 has a communication bus, as many remote devices do, CPS 10 could communicate directly with remote device 12 by way of adapter 14.

Figure 2:
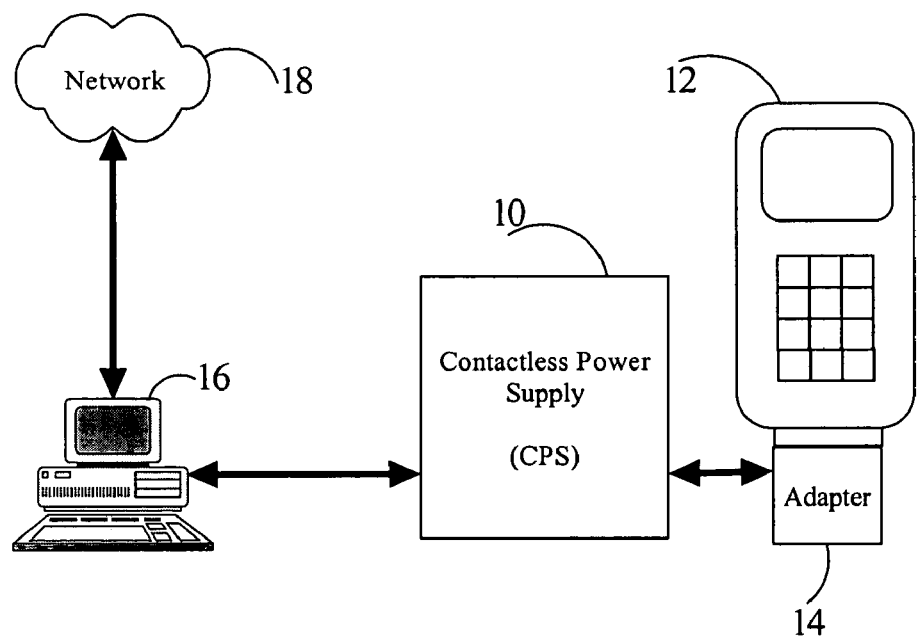
FIG. 2 shows a CPS system interfaced with a computer workstation and a remote device equipped with a CPS interface.

FIG. 2 shows CPS 10 is connected to PC (personal computer) 16. PC 16 is coupled to network 18. Network 18 could be a LAN (local area network), a WAN (wide area network) or the Internet. Personal computer 16 can communicate with remote device 12 by way of CPS 10. According to this embodiment, remote device 12 can communicate with PC 16 and optionally network 18 by way of adapter 14 and CPS 10.

Figure 3:
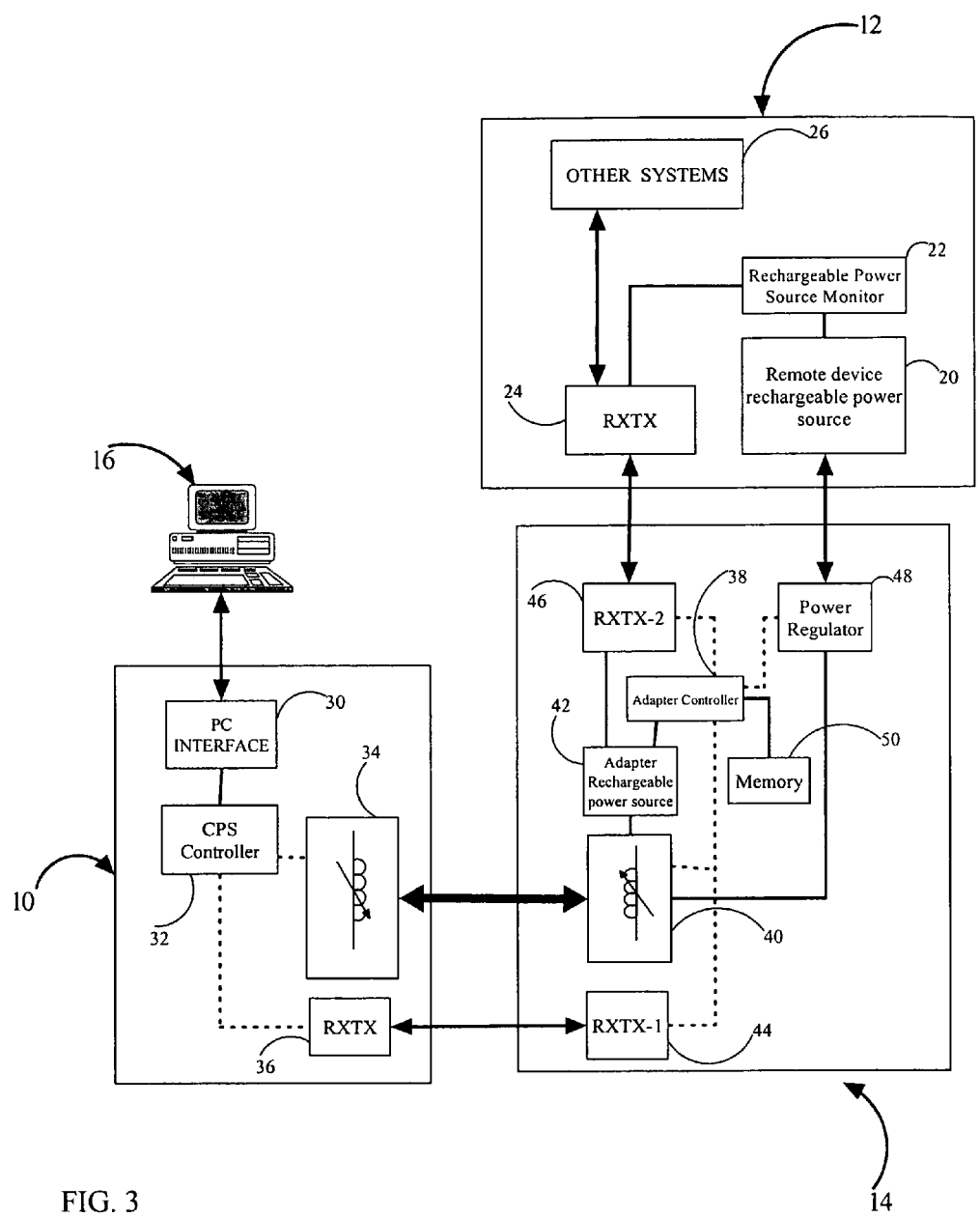
FIG. 3 is a block diagram of a CPS interface for a remote device.

FIG. 3 shows block diagrams of CPS 10, adapter 14, and remote device 12. Remote device rechargeable power source 20 supplies power to remote device 12. Rechargeable device power source monitor 22 oversees the operation of rechargeable power source 20. Rechargeable device power source monitor 22 and remote device rechargeable power source 20 could be components of modern rechargeable batteries known commonly as "smart batteries" or "intelligent batteries". In smart batteries, rechargeable device power source monitor 22 can provide information related the operation and power requirements of remote device rechargeable power source 20, such as the temperature, current draw, voltage, remaining charge, and estimated time to complete charge. Further enhancements to the information supplied by smart batteries have been proposed. For example, U.S. Pat. No. 5,572,110 contains several enhancements for information that could be monitored relating to the operation of a smart battery.

Comm link 24 is a communication link provided within remote device 12. Comm link 24 could be a USB, RS-232, serial, single wire, two wire, on any other suitable communication link. Comm link 24 could be connected to the system management bus of remote device 12 or directly to the rechargeable device power source monitor 22.

Remote device 12 could also contain a number of other systems providing unique functionality of remote device 12.

PC 16 is connected to CPS 10 by way of PC interface 30. PC interface 30 could be any type of interface, such as USB (universal serial bus), Firewire, RS-232, parallel, Bluetooth, WIFI, or any other interface allowing two-way communication between two or more devices.

CPS controller 32 has a number of different functions. It controls the communication of PC 16 through PC interface 30. It also controls the operation of CPS power interface 34. One embodiment of CPS power interface 34 is more fully described in application "Adaptive Inductive Power Supply," assigned to the assignee of this application naming David Baarman as inventor, Ser. No. 10/689,499, which is hereby incorporated by reference. CPS controller 32 can adjust the frequency, duty cycle, and resonant frequency of CPS power interface 34.

CPS controller 32 also controls the operation of transceiver 36. CPS transceiver 36 could use many different types of communication protocols. CPS transceiver 36 could be entirely separate from CPS power interface 34 and have its own communication antenna and communication protocol. Alternatively, it could be integral with CPS power interface and communicate with a remote device by was of any one of a number of PLC (power line communication) protocols.

Adapter 14 contains adapter controller 38. Adapter controller 38 controls the various components of adapter 14. Adapter controller 38 could be any one of a multitude of commonly available microcontrollers programmed to perform the functions hereinafter described, such as the Intel 8051 or the Motorola 6811, or any of the many variants of those microcontrollers. Adapter controller 38 could have a ROM (read only memory) and RAM (random access memory) on the chip. Adapter controller 38 could have a series of analog and digital outputs for controlling the various functions within adapter 14.

Adapter controller 38 is connected to contactless power interface 40. Alternatively, adapter controller 38 could be a microprocessor in association with a microcontroller.

Contactless power interface 40 could include a resonant tank circuit. If contactless power interface contained a resonant tank circuit, then adapter controller 38 could control, among other things, the resonant frequency of contactless power interface 40 as well as whether contactless power interface 40 is coupled to any other devices in adapter 14. To vary the resonant frequency of the tank circuit, contactless power interface 40 would adjust the impedance of a variable impedance element. If the variable impedance element were a variable inductor, then the inductance of the variable inductor would be changed.

Contactless power interface 40 is connected to adapter rechargeable power source 42. Adapter rechargeable power source 42 is the power supply for the Adapter 14. Adapter rechargeable power source 42 could include a conventional rechargeable battery or a microcapacitor. A microcapacitor would be preferable due to its very short charging time.

Adapter transceiver 44 allows communication with CPS transceiver 36. Adapter transceiver 44 and CPS transceiver 36 would use the same protocol and method of communication. Adapter controller 38 regulates the communication through adapter transceiver 44.

Alternatively, adapter transceiver 44 could be simply a transmitter. In such a situation, only limited information would be sent to transceiver 36, such as the power consumption information for remote device 12. The power consumption information of remote device 12 or adapter 14 could be stored in memory 50. In such a situation, adapter transceiver 44 could be simply an RFID (radio frequency identification) device.

Second transceiver 46 provides a communication path with remote device 12 by connecting with remote device remote device transceiver 24. The connection with remote device remote device transceiver 24 could be physical. Thus, information could be transmitted between PC 16 and remote device 12 by way of remote device remote device transceiver 24, adapter second transceiver 46, adapter transceiver 44, CPS transceiver 36, and PC interface 30.

Power regulator 48 supplies power to remote device rechargeable power source 20. Power regulator 48 could contain discrete components or it could be a single integrated circuit dedicated to voltage, current and/or power regulation. Power regulator 48 can be turned on or off by adapter controller 38. Further, adapter controller 38 can control the voltage and current output of power regulator 48 to remote device rechargeable power source 20.

Memory 50 is coupled to adapter controller 38. Memory 50 contains information relating to remote device 12. Memory 50 also optionally contains an identification number identifying remote device 12. For example, memory 50 might contain an identification number indicating that adapter 14 is for use with a specific type of PDA, such as a Palm Pilot.

In such a situation, the identification number could then be used by CPS 10 to determine from a look-up table the power usage information about adapter 14 and remote device 12.

Figure 4:
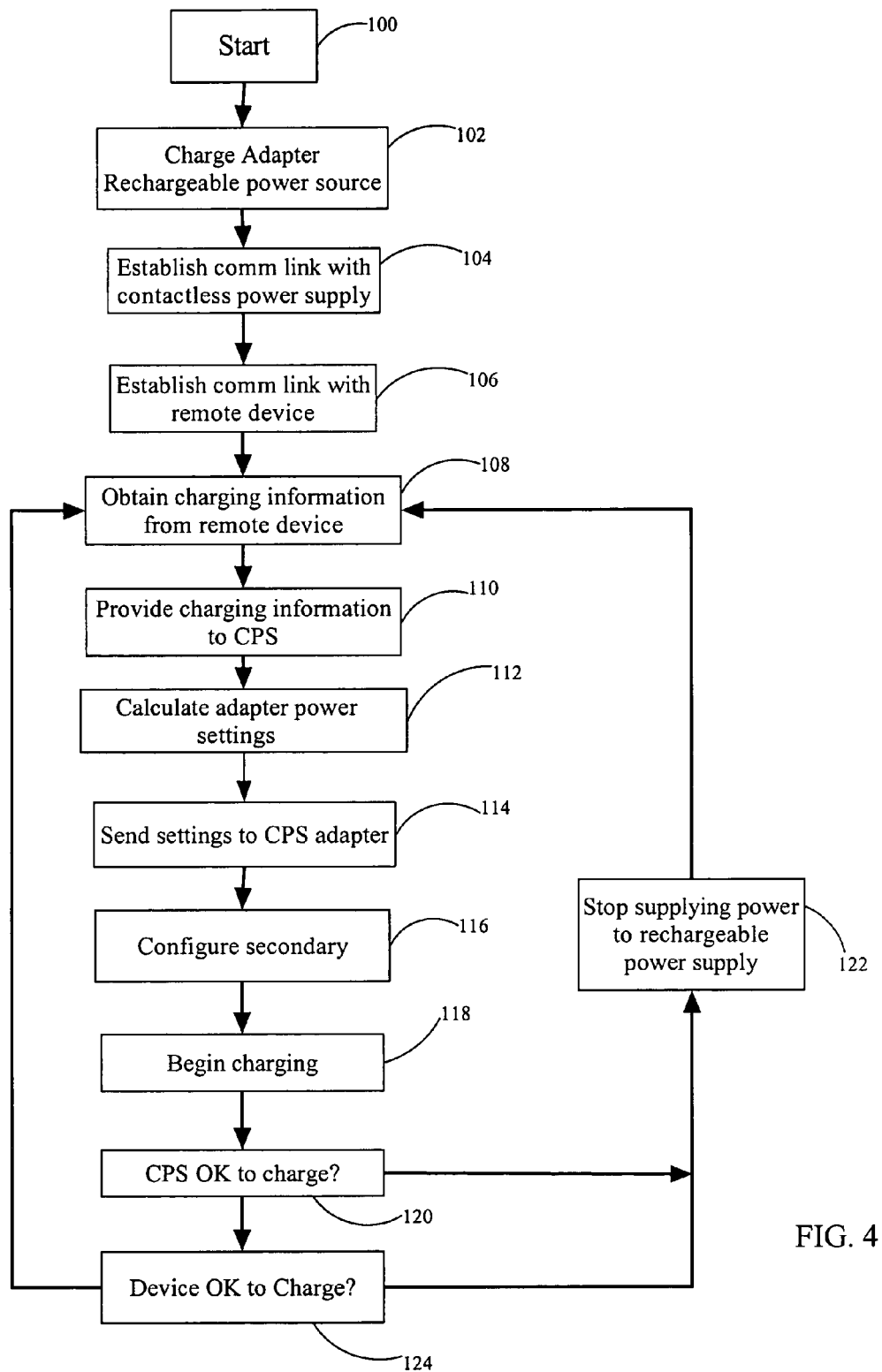
FIG. 4 is a method of operation of a CPS interface.

FIG. 4 shows the operation of CPS 10, remote device 12 and Adapter 14. CPS 10 is provided with power from an external power supply (not shown) and energizes CPS power interface 34. Placement of contactless power interface 40 within proximity of the energized CPS 10 induces charging of adapter rechargeable power source 42. Step 100. Obviously, if adapter rechargeable power source 42 is already charged, no further charging occurs. Once sufficient charge is stored within adapter rechargeable power source 42, adapter controller 38, adapter second transceiver 46, and adapter transceiver 44 are energized. Step 102.

A data communication link is then established between CPS 10 and Adapter 14. Step 104. A second data communication link between adapter 14 and remote device 12 is then established. Step 106. At this time, charging information is obtained from remote device 12. Step 108. Charging information could include amount of charge remaining within rechargeable power source 20, the time to recharge the rechargeable power source 20, the voltage requirements of remote device 12 to charge rechargeable power source 20, and the current requirements of remote device 12 to charge rechargeable power source 20. Adapter 14 then provides this charging information to CPS 10. Step 110.

CPS 10 then calculates the optimal setting for contactless power interface 40. Step 112. CPS 10 could provide that information to adapter 14. Alternatively, adapter 14 could retrieve similar information from remote device 12. Step 114. Adapter controller 38 then configures contactless power interface 40. Step 116. It could be that rechargeable power source 20 is charged or cannot be charged. In that case, CPS 10 would configure adapter 14 to supply no power to remote device 12.

If contactless power interface 40 includes an adjustable resonant tank circuit, adapter controller 38 could configure the resonant frequency of the adjustable resonant tank circuit.

At that time, if necessary, charging of the rechargeable power source 20 commences. Step 118. Adapter 14 then checks CPS 10 to determine if CPS has sufficient capacity to charge remote device 12. Step 120. If not, charging ceases. Step 122. If so, then Adapter 14 determines from remote device 12 whether charging should continue. Step 124. If not, charging ceases. Step 122.

At this time, charging information is retrieved from remote device 12, and the process is repeated. Step 108.

Figure 5:
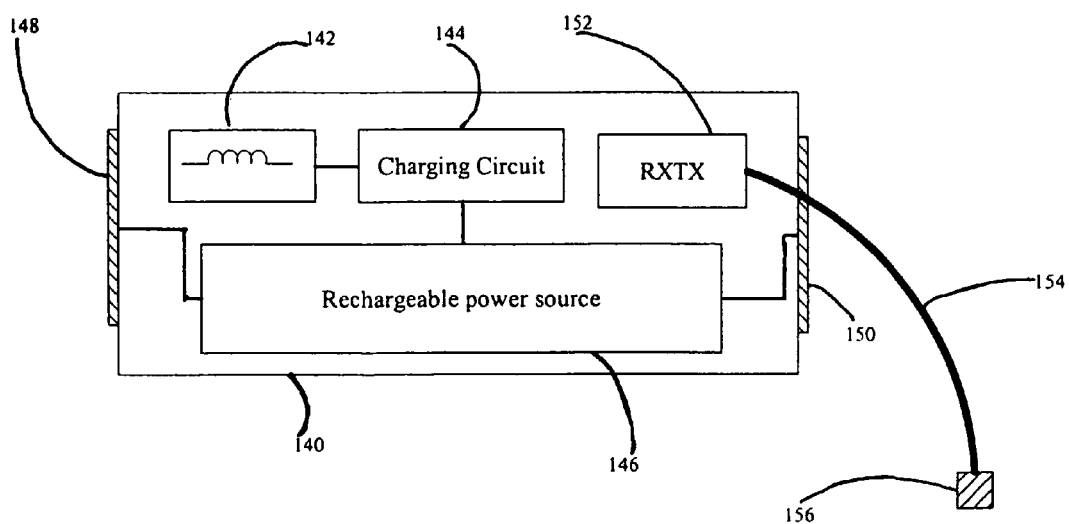
FIG. 5 is an alternative embodiment for the adapter.

FIG. 5 shows another embodiment for the adapter. Housing 140 encloses a secondary winding 142, a charging circuit 144, and a rechargeable power source 146. Secondary winding 142 receives power from CPS 10. Secondary winding 142 could be a triaxial winding having three winding orthogonally disposed, as is more fully described in a patent application entitled, Inductive Coil Assembly, assigned to the assignee of this application, and naming David W. Baarman and Terry L. Lautzenheiser as inventors.

Charging circuit 144 supplies the power in an appropriate form to rechargeable power source 146. Rechargeable power source 146 could be, for example, a super capacitor or a rechargeable battery. Connectors 148, 150 allow the adapter to be placed within the remote device as a replacement for the battery. For example, if the remote device used a 12 volt dry cell battery, then housing 140 would be of the same shape and configuration as a 12 volt dry cell battery. Thus, the adapter would be a 'drop-in' replacement for the 12 volt dry cell battery. Alternatively, if the remote device used a 600 MA lithium ion battery, then housing 140 and electrical connectors 148, 150 would be configured to look and operate similar to that particular battery.

The adapter shown in FIG. 5 could be equipped with wireless transceiver 152 if the remote device has a communication port, such as a USB or firewire port. Wireless transceiver 152 could receive and send information to a workstation by way of CPS 10. Wireless transceiver 152 is connected to dongle 154. Dongle 154 is supplied with dongle connector 156. Dongle connector 156 would be placed into the communication port of the remote device. Communication is thereby enabled between the remote device and the CPS.

Figure 6:
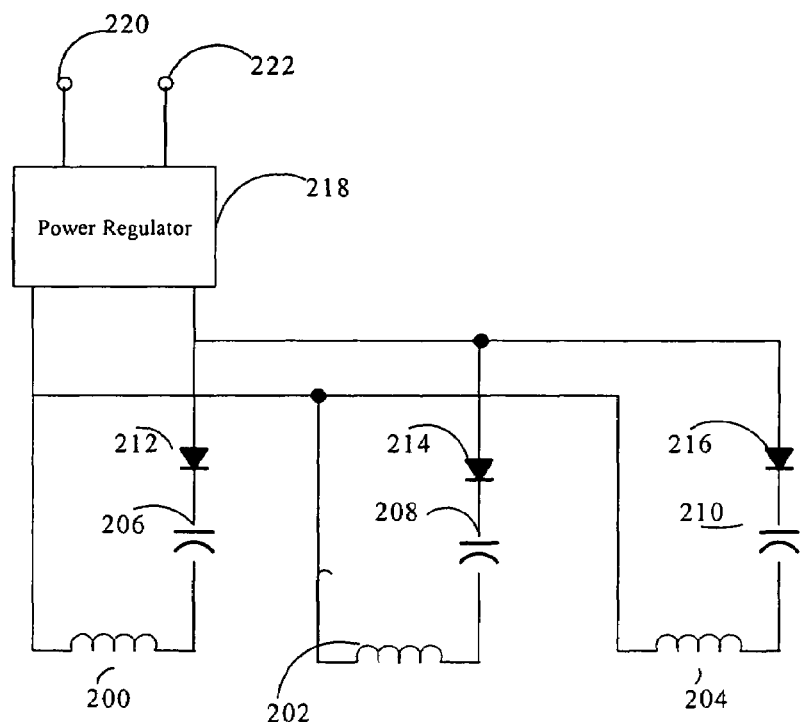
FIG. 6 is a circuit diagram of a CPS interface.
Figure 7:
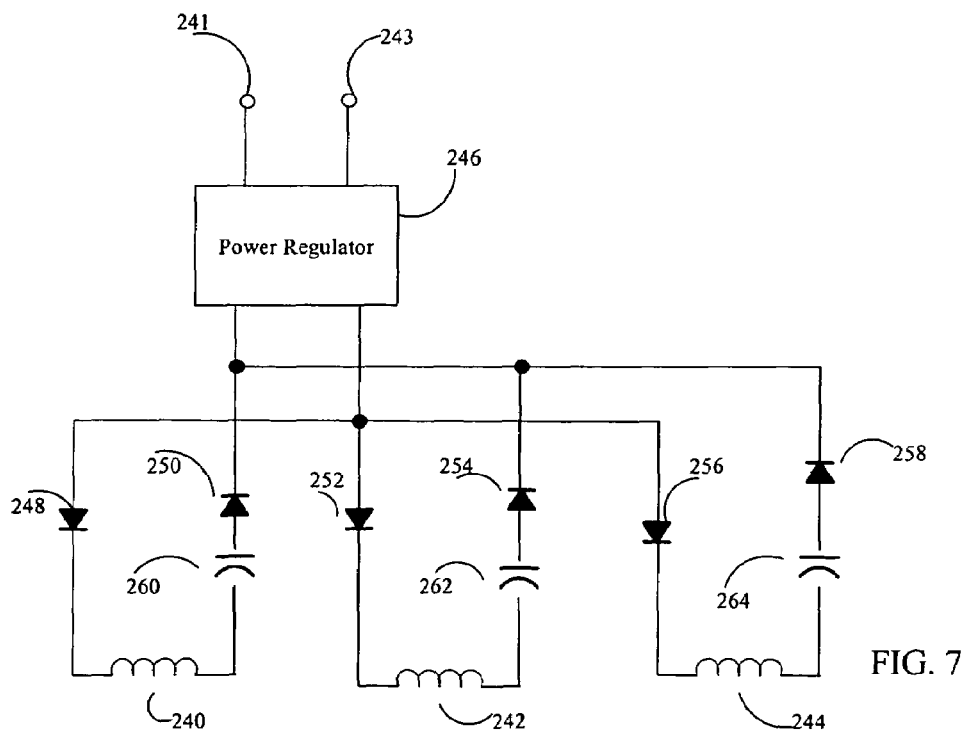
FIG. 7 is a circuit diagram of a CPS interface having a half-wave rectifier.
Figure 8:
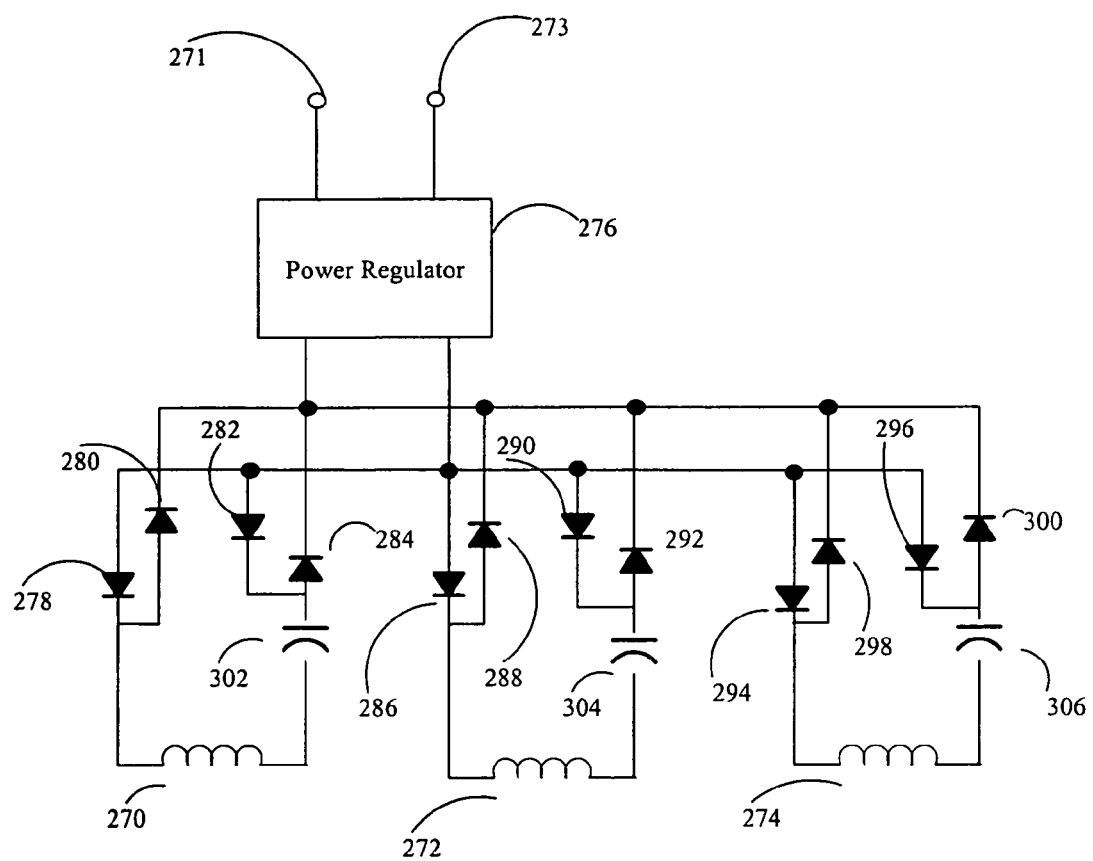
FIG. 8 is a circuit diagram of a CPS interface having a full-wave rectifier.

FIGS. 6-8 show circuit diagrams for three embodiments of adapter 14. In these embodiments, adapter 14 supplies power only to remote device 12. The adapter 14 includes multiple coils in different orientations to provide improved coupling when the remote device is at different orientations within the electromagnetic field generated b CPS.

FIG. 6 illustrates an adapter for connection to a remote device. As shown, three coils 202, 204, 206 are connected in parallel to the load. The three coils could be orthogonally configured, as described in patent application Inductive Coil Assembly, assigned to the assignee of this application, and filed on the same day as this application. Capacitors 206, 208, 210 and diodes 212, 214, 216 are connected in series with each coil 200, 202, 204. The values of the various components are selected to provide a resonant frequency. The power induced within each of coil 202, 204, 206 is combined at the input of power regulator 218. Alternatively, diodes 212, 214, 216 can be eliminated from the circuit 680 to provide AC power to power regulator 218. Power regulator 218 regulates the voltage and current available at terminals 220, 222. Terminals 220, 222 are for connection to the power input of a remote device.

FIG. 7 shows an adapter using a half wave rectifier receiving power from three separate coils 240, 242, 244. As shown, coils 240, 242, 244 are connected in parallel to power regulator 246 through an arrangement of diodes 248, 250, 252, 254, 256, 258 connected in series with each coil 240, 242, 244. In this embodiment, the value of each diode 248, 250, 252, 254, 256, 258 is determined based primarily on the characteristics of power regulator 246. Power regulator 246 provides a relatively constant voltage and current output at terminals 241, 243. Additionally, a capacitor 260, 262, 264 is connected in series between one side of coil 240, 242, 244 and the corresponding diodes 250, 254, 258. The value of each capacitor 260, 262, 264 is also determined based primarily on the characteristics of the load.

FIG. 8 illustrates a full wave rectifier circuit used within an adapter. As shown, coils 270, 272, 274 are connected in parallel to power regulator 276 through an arrangement of diodes 278, 280, 282, 284, 286, 288, 290, 292, 294, 296, 298, 300. In this embodiment, the value of each diode 278, 280, 282, 284, 286, 288, 290, 292, 294, 296, 298, 300 is determined based primarily on the characteristics of power regulator 276. Power regulator 276 provides a relatively constant voltage and current output at terminals 271, 273. Additionally, each capacitor 302, 304, 306 is connected in series between one side of the respective coil 270, 272, 274 and the corresponding diodes 282, 284, 290, 292, 296, 300. The value of each capacitor 302, 304, 306 is determined based primarily on the characteristics of power regulator 276.

Power regulators 218, 246, 276 are able to provide at their respective output terminals a constant voltage and constant current, even when the power derived from the coils is operating at different frequencies. CPS 10 may provide power at different frequencies. Thus, the current and voltage induced in the respective coils of the adapter could also have different currents and voltages. Power regulators 218, 246, 276 are designed to accommodate the difference in the current and voltage produced by the coils.

The above description is of the preferred embodiment. Various alterations and changes can be made without departing from the spirit and broader aspects of the invention as defined in the appended claims, which are to be interpreted in accordance with the principles of patent law including the doctrine of equivalents. Any references to claim elements in the singular, for example, using the articles "a," "an," "the," or "said," is not to be construed as limiting the element to the singular.

The embodiments of the invention in which an exclusive property or privilege is claimed are defined as follows:

1. A system for charging a remote device rechargeable power source comprising:

a remote device including the remote device rechargeable power source and a remote device transceiver;

a contactless power supply having a primary and a CPS transceiver; and an adapter removably connectable to the remote device and including a secondary, a power regulator to supply power to the remote device rechargeable power source, an adapter rechargeable power source for powering the adapter, a first adapter transceiver to establish a first two-way communication link with the remote device transceiver, and a second adapter transceiver to establish a second two-way communication link with the CPS transceiver, the first two-way communication link and the second two-way communication link providing a serial two-way communication path between the remote device and the contactless power supply.

2. The system of claim 1 further comprising a controller to control the power regulator.

3. The system of claim 2 where the controller includes a variable impedance element having an impedance.

4. The system of claim 3 where the controller is capable of changing the impedance of the variable impedance element.

5. The system of claim 4 where the variable impedance element is a variable inductor.

6. The system of claim 5 where the controller varies the impedance of the variable inductor in response to instructions from the contactless power supply through the second communication link.

7. The system of claim 6 where the adapter receives charging requirements from the remote device through the first communication link.

8. A remote device charging system comprising:

a remote device having a remote device rechargeable power source;

a contactless power supply including a primary;

an adapter including a secondary and an adapter rechargeable power source, the adapter being removably connected to the remote device;

a first two-way communication link between the remote device and the adapter; and a second two-way communication link between the adapter and the contactless power supply, the first two-way communication link and the second two-way communication link providing a serial two-way communication path between the remote device and the contactless power supply.

9. The system of claim 8 further comprising:

a computer; and a third two-way communication link between the contactless power supply and the computer.

10. The system of claim 9 wherein each of the first and second communication links includes two transceivers.

11. The system of claim 8 wherein each of the communication links includes two transceivers.

12. A method of connecting a remote device to a network through a contactless power supply comprising:

creating a first communication link between the remote device and an adapter;

creating a second communication link between the adapter and the contactless power supply;

creating a third communication link between the contactless power supply and a computer; and creating a fourth communication link between the computer and the network, whereby the remote device can communicate with the network through the first, second, third, and fourth communication links.

13. The method of claim 12 further comprising:

providing to the contactless power supply through the first and second communication links information about a remote device rechargeable power source within the remote device; and supplying power to the remote device rechargeable power source in response to the information.

14. The method of claim 13 wherein the information includes charging information.

15. The method of claim 12 wherein each of the first and second creating steps includes using two transceivers.

* * * * *